United States Patent
Da Palma et al.

(10) Patent No.: US 7,099,931 B2
(45) Date of Patent: Aug. 29, 2006

(54) METHOD OF AUTOMATICALLY GENERATING AN SNMP MANAGEMENT INFORMATION BASE FROM EXTENSION-ENABLED MANAGEMENT AGENTS

(75) Inventors: William V. Da Palma, Coconut Creek, FL (US); Victor S. Moore, Boynton Beach, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 10/324,538

(22) Filed: Dec. 19, 2002

(65) Prior Publication Data

US 2004/0122922 A1    Jun. 24, 2004

(51) Int. Cl.
    G06F 13/00    (2006.01)
(52) U.S. Cl. .................. 709/220; 709/224; 709/250
(58) Field of Classification Search ........... 709/201, 709/202, 203, 217, 223, 224
    See application file for complete search history.

(56) References Cited

U.S. PATENT DOCUMENTS

| | | | |
|---|---|---|---|
| 6,009,431 A * | 12/1999 | Anger et al. ............. 707/10 |
| 6,317,748 B1 | 11/2001 | Menzies et al. ......... 707/103 X |
| 6,332,142 B1 | 12/2001 | LeBlanc .................. 707/100 |
| 6,360,258 B1 * | 3/2002 | LeBlanc .................. 709/223 |
| 6,389,464 B1 * | 5/2002 | Krishnamurthy et al. ... 709/220 |
| 2002/0097721 A1 | 7/2002 | McKenzie et al. .......... 370/392 |
| 2003/0028895 A1 * | 2/2003 | Buehler et al. ............ 725/119 |
| 2003/0074429 A1 * | 4/2003 | Gieseke et al. ............ 709/221 |
| 2003/0177214 A1 * | 9/2003 | Chen et al. ............... 709/223 |

FOREIGN PATENT DOCUMENTS

| | | |
|---|---|---|
| JP | 2000-267961 | 9/2000 |
| JP | 2000-286869 | 9/2000 |
| SE | 9603963-1 | 5/2001 |

OTHER PUBLICATIONS

U.S. Appl. No. 10/189,722, filed Jul. 3, 2002, Da Palma et al.
Service Interface That Supports Simple Network Management Protocol, *IBM Technical Disclosure Bulletin*, vol. 35, No. 4A, pp. 182-186, (Sep. 1992).
SNMP Based Network Management Using CORBA, *IEEE*, pp. 276-278, (1998).
C. Tsai, et al., SNMP Through WWW, *Int'l. Journal of Network Management*, vol. 8, pp. 104-119, (1999).
S. Ahn, et al., Design and Implementation of a Web-based Internet Performance Management System Using SNMP MIB-II, *Int'l. Journal of Network Management*, vol. 9, pp. 309-321, (1999).

(Continued)

*Primary Examiner*—Viet D. Vu
(74) *Attorney, Agent, or Firm*—Akerman Senterfitt

(57) ABSTRACT

A method and machine readable storage for adding a simple network management protocol (SNMP) interface to an existing resource management extension-enabled management agent. The SNMP interface can be added without modifying the management agent. The method includes the step of reading definitions of managed objects associated with said management agent. The definitions can be read at runtime of the management agent. A SNMP management information base (MIB) definition is automatically generated. The SNMP MIB provides a SNMP representation of the management agent and incorporates SNMP object definitions correlating to at least a portion of read managed object definitions.

22 Claims, 3 Drawing Sheets

OTHER PUBLICATIONS

A. John, et al., A Java-based SNMP Agent for Dynamic MIBs, *IEEE Global Telecommunications Conf. '99*, pp. 396-400, (1999).

F. Strauss, et al., Open Source Components for Internet Management by Delegation, *IEEE*, pp. 185-198, (2001).

K. Wolcott, Exposing MIB Data to a Web-Based Interface, *Embedded Systems Programming*, vol. 13, No. 4, pp. 55-68, (Apr. 2000).

K. Wolcott, Exposing MIB Data to a Web-Based Interface—Part 2, *Embedded Systems Programming*, vol. 13, No. 5, pp. 69-81, (May 2000).

*Introduction to SNMP Traps*, <http://www.tools4nt.com/Products/mon/manual/Introduction_SNMP_traps.htm>, (viewed Dec. 4, 2002).

* cited by examiner

METHOD OF AUTOMATICALLY GENERATING AN SNMP MANAGEMENT INFORMATION BASE FROM EXTENSION-ENABLED MANAGEMENT AGENTS

BACKGROUND OF THE INVENTION

1. Technical Field

This invention relates to the field of resource management, and more particularly, to interfacing network management systems with management agents.

2. Description of the Related Art

Management agents serve as an interface providing a layer of isolation between management systems and managed resources such as business applications, devices, or software implementations of services or policies. Management agents can be implemented using resource management extensions to programming languages. Accordingly, to manage resources via a particular resource management extension architecture, the resource must be enabled in accordance with the specification of the management agent with which the resource is to communicate.

Although resource management extensions exist for various programming languages, one example of a resource management extension architecture is the Java Management Extension (JMX) architecture. JMX®, defined in the JMX specification, defines an architecture, design patterns, application programming interfaces (APIs), and services for application and network management using the Java programming language. The JMX specification is a set of specifications and development tools for managing Java environments and building management solutions. The JMX specification, which is incorporated herein by reference, has been defined in the document *Java Management Extensions Instrumentation and Agent Specification*, v1.1 (March 2002), published by Sun Microsystems, Inc. of Palo Alto, Calif.

Although resource management extension architectures continue to gain favor as industry standards, a limited number of such architectures are in operation. Many legacy systems, for example Unix-based products, rely upon Simple Network Management Protocol (SNMP). Presently, no standardized solution exists to provide interoperability between resource management solutions such as JMX and legacy systems using SNMP. In consequence, there is no way to provide a unified management console view of a mixed SNMP legacy and resource management extension-enabled management agent without making significant modifications to the management agent.

Conventional interface solutions between legacy SNMP systems and management agents typically have been implemented as standalone systems which are not integrated into the management agent. As such, the standalone solutions cannot take advantage of the full range of features provided by the management agent. For example, standalone solutions cannot take advantage of notifications.

Another disadvantage of conventional interface solutions is that significant recoding and/or rebuilding of portions of the management agent is required. That is, to implement a conventional interface, developers must re-build managed objects of the management agent using tools provided by the solution package to ensure that the resulting managed objects have the requisite knowledge of the SNMP management system. To provide another example, conventional solutions for interfacing a JMX management agent with a SNMP system require developers to generate the managed objects or MBeans using a tool provided by the interface solution so that the resulting MBeans have knowledge of the SNMP system.

Such conventional solutions are implemented from the perspective of the SNMP system rather than from the perspective of the management agent. As a result, conventional solutions cannot be applied to existing resource management extension-enabled products, such as JMX-enabled products, without rebuilding and/or recoding the software management components of the management agent.

SUMMARY OF THE INVENTION

The invention disclosed herein provides a method and machine readable storage for interfacing a management agent with a Simple Network Management Protocol (SNMP) based management system. According to the present invention, existing management agent implementations which utilize resource management extension technology can be automatically provided with SNMP support without having to implement code changes within the management agent. The Management Information Base (MIB) can be used by the SNMP management system to communicate with the existing management agent using SNMP protocol.

The method includes the step of reading definitions of managed objects associated with a management agent at runtime of the management agent. A SNMP MIB definition is automatically generated using the managed object definitions to provide a SNMP representation of the management agent. The managed object definitions can be filtered using specified parameters to select a portion of the managed object definitions to be included into the MIB. The managed object definitions can be associated with a SNMP table within the MIB, thereby enabling a managed object to have multiple instantiations.

At least a portion of a name for an attribute and/or a method can be automatically provided using a name of a managed object corresponding to the attribute and/or the method. Further, at least one trap corresponding to a unique management agent can be built in the MIB. The trap can include fields which have a one-to-one correspondence with fields of notifications propagated by the unique management agent.

A SNMP protocol adapter can be provided to serve as an interface between the management agent and a SNMP management system. The management agent can be implemented in Java and the resource management extension can be a Java Management Extension (JMX). Further, the management agent can be a JMX management bean server (MBeanServer) and the managed objects can be JMX managed beans (MBeans).

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a solution for interfacing a management agent with a Simple Network Management Protocol (SNMP) based management system. According to the present invention, existing management agent implementations which utilize resource management extension technology can be automatically provided with SNMP support without having to implement code changes within the management agent. In particular, a mapper tool can be provided which automatically creates a SNMP management information base (MIB) representing the management agent. The MIB can be used by the SNMP management system to communicate with the existing management agent using SNMP protocol. Importantly, the MIB can be created after a product has been deployed, thereby enabling the product to interface with a legacy SNMP management system.

Figure 1:
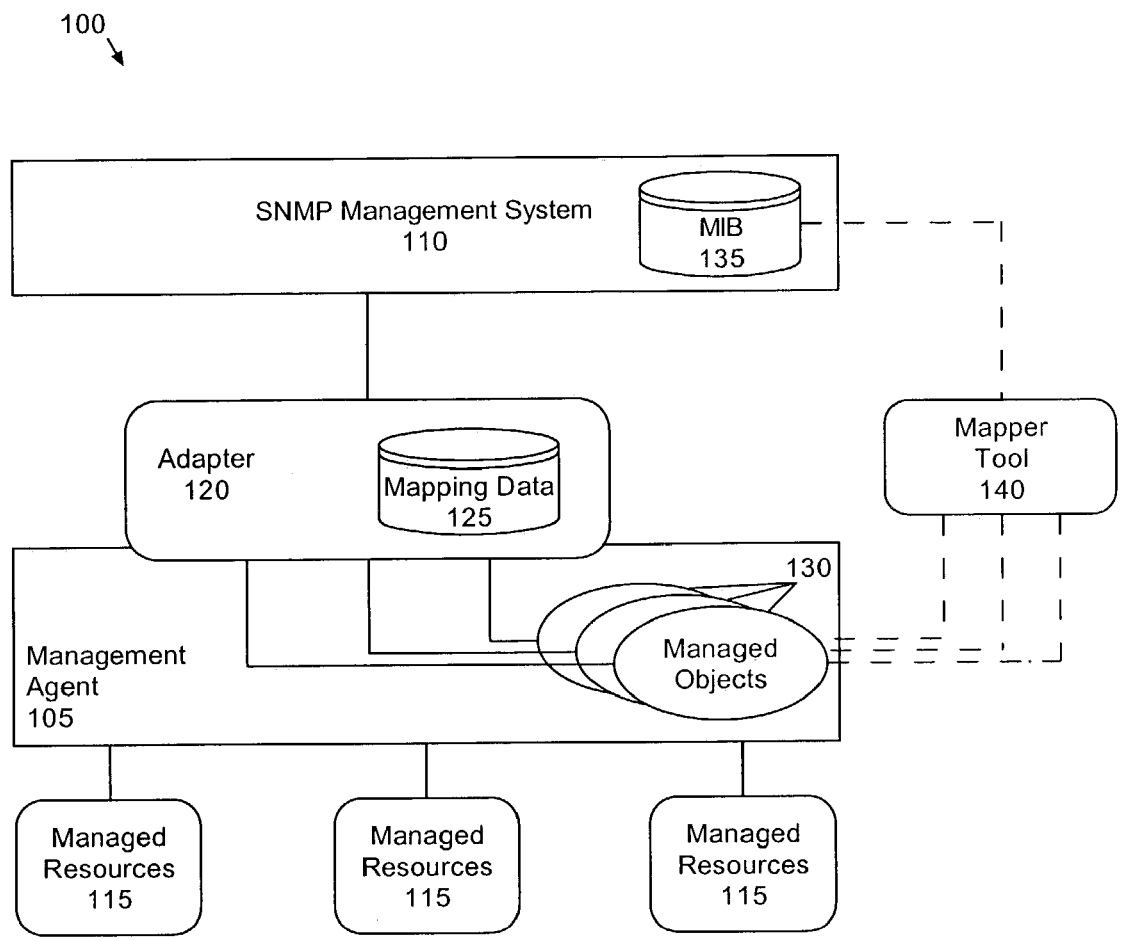
FIG. 1 is a schematic diagram illustrating a system for interfacing an existing management agent and a management system in accordance with the inventive arrangements disclosed herein.

FIG. 1 is a schematic diagram illustrating a system 100 for interfacing an existing management agent and a management system in accordance with the inventive arrangements disclosed herein. The system 100 includes a management agent 105 which is used to interface a management system 110 with various managed resources 115. The management system 110 can be any of a variety of SNMP-enabled management systems (SNMP management system) including sophisticated enterprise level management systems or domain specific management systems. The management system 110 can include a console through which personnel can monitor and interact with the managed resources 115. As noted, the managed resources 115 can include, but are not limited to, business applications, devices, or software implementations of services or policies.

The management agent 105 can be any of a variety of resource management extension-enabled programming language architectures which serve to isolate the managed resources 115 of an information technology system from the SNMP management system 110. The management agent 105 can function as a management software component server including management software components (managed objects) 130. For example, according to one embodiment of the present invention, the management agent 105 can be implemented using the Java Management Extension (JMX) architecture. Accordingly, the management agent 105 can be a JMX management bean or MBean server.

A MIB 135 can be created to manage resources via a SNMP management system. The resulting MIB definition provides a SNMP representation of the management agent 105 which is used by the management system 110 (or console of the management system) to interpret data from the management agent 105. For example, the MIB definition can provide logical names for object identifiers (OID's) of the SNMP management system 110.

The MIB 135 only needs to be created once, for example after a product has been deployed. If changes are made to the managed objects represented in the MIB 135, then the MIB 135 can be updated or recreated. Importantly, the present invention can generate the MIB 135 at runtime using a mapper tool 140, which is a program that reads parameters of managed objects 130 and generates a MIB definition. In order for the MIB definition to properly include all necessary management object 130 data, any managed objects that will be accessed by the SNMP management system 110 should be loaded when the MIB 135 is created. In one arrangement, a program, for example a boot strap program, can used to load all managed objects 130 when the mapper tool 140 is activated. The bootstrap program then can terminate when loading of the managed objects 130 is complete.

The management agent 105 can include an adapter 120 for communicating with the SNMP management system 110. It should be appreciated that various resource management extension architectures, including JMX, define a mechanism for adding protocol adapters. Accordingly, the adapter 120 can be a plug-in protocol adapter serving as an interface between the management agent 105 and the SNMP management system 110.

The adapter 120 can include mapping data 125. The mapping data 125 specifies relationships among SNMP OID's and managed objects 130. Notably, the mapping data 125 can be automatically generated after the MIB 135 has been created. For example, when the adapter 120 loads, the adapter 120 can read the MIB definition to create a static mapping of SNMP object identifiers to managed objects. Alternatively, the static mapping can be performed by a mapping tool (not shown). The mapping data 125 can be dynamically updated or replaced if the MIB 135 is updated or replaced.

Figure 2:
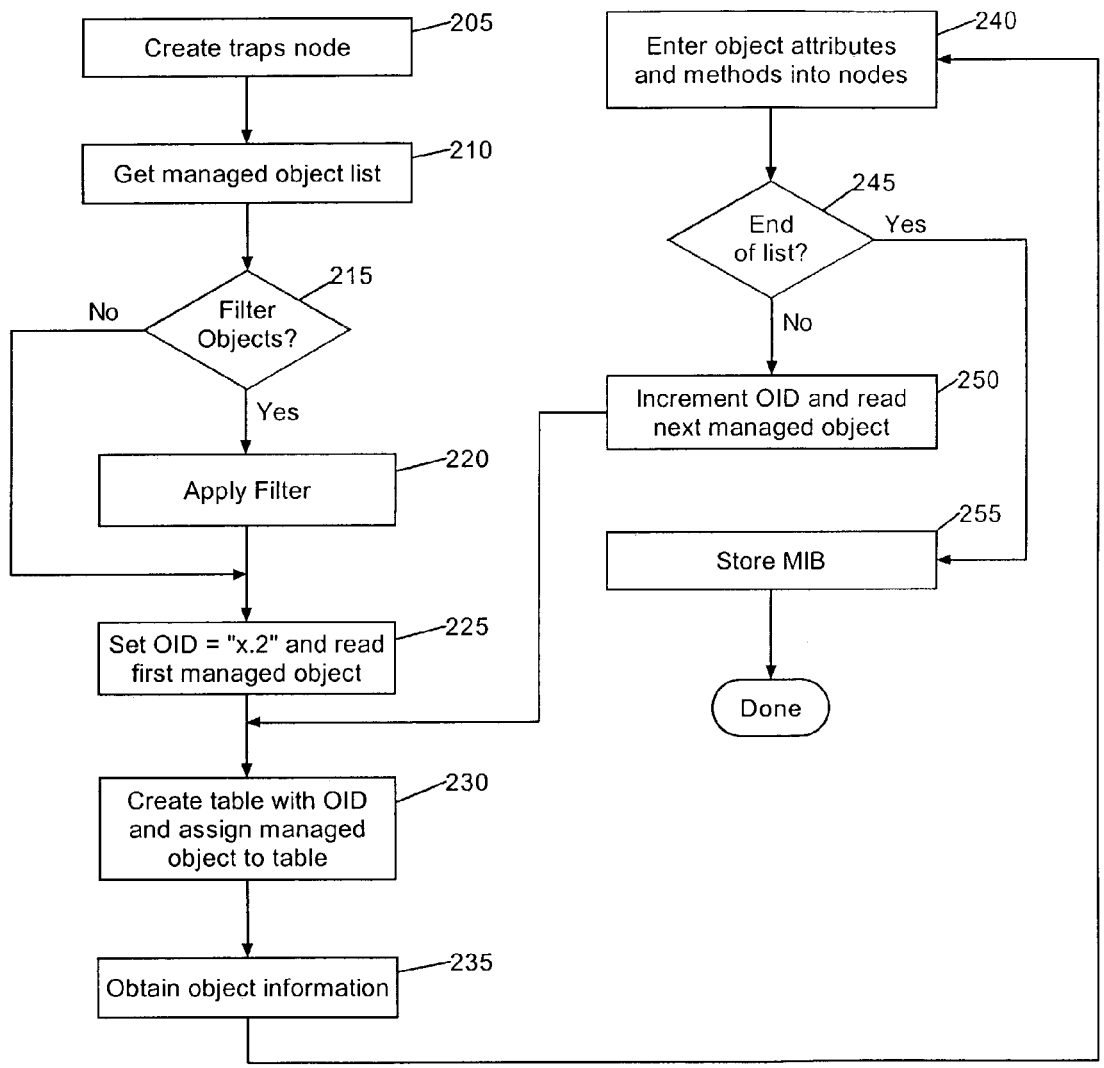
FIG. 2 is a flow chart illustrating a method of generating a management information base for managing resources via a Simple Network Management Protocol management system.

FIG. 2 is a flow chart illustrating a method 200 of generating a MIB for managing resources via a SNMP management system. As noted, the mapper tool can be used to create the MIB definition. Referring to step 205, a "traps" node can be provided in the MIB. The traps node can be a node (child node) in the MIB definition tree which is directly below a node representing a product incorporating the managed resources. The mapper tool can reserve a SNMP OID for the traps node, for instance "x.1," where "x" is a user entered SNMP base OID correlating to the product node. For example, if the product incorporating the managed resources is registered at OID 1.3.6.1.4.1.2.6.999, then x=1.3.6.1.4.1.2.6.999 and the OID of the traps node can be 1.3.6.1.4.1.2.6.999.1. Importantly, this is merely one exemplary method of providing OID's and the invention is not limited to this example. In particular, other OID assignment methods can be used. For instance, an application can be provided to automatically pass the SNMP base OID to the mapper tool, or alternate naming and/or numbering conventions can be used.

A traps group can be defined within the traps node wherein fields in the traps group are mapped to have a one-to-one correspondence with fields of a managed object notification. For example, if the managed object notifications include fields for syntax, access, status and description, the traps within the traps group can incorporate these same fields. Accordingly, a mapping for every field in the notification can be represented as a SNMP trap parameter and all events from the managed objects can be processed using the traps in the traps group.

Each trap in the traps group can be assigned an OID of "x.1.y," where "y" can begin with 1 and can be incremented by 1 for each successive trap. For example, a first trap in the traps group can be an "event type" (evType) trap with an OID of x.1.1 (1.3.6.1.4.1.2.6.999.1.1). A second trap in the traps group can be an "event source" (evSrc) trap with an OID of x.1.2 (1.3.6.1.4.1.2.6.999.1.2). A third trap in the traps group can be "event sequence number" (evSeqNbr) trap with an OID of x.1.3, and so on. As noted, this is merely an example of a numbering convention and other numbering conventions can be used.

Referring to step 210, the mapper tool can get a managed object list from the management agent associated with the product. For example, the mapper tool can query the management agent for the managed object list. Referring to decision box 215 and step 220, the managed object list can be filtered, for example to restrict the selection of managed objects which are incorporated into the MIB. Alternatively, a complete list of managed objects can be processed by the mapper tool and incorporated into the MIB.

The filter can be provided when certain managed objects are not required to be incorporated into the MIB. For example, certain managed objects may be provided for internal use by a product and may need not be accessible by a system console. The managed objects can be filtered using any method which can be used to selectively discriminate between managed objects. For example, in one arrangement, the mapper tool can provide conditional statements in a query which is sent to the management agent. Accordingly, a filtered list of managed objects can be received by the mapper tool. In another arrangement, the mapper tool can apply a filter to the complete list of managed objects. Still, other filter methods can be used to select managed objects for incorporation into the MIB.

The MIB definition can be created such that a node in the MIB definition tree is defined for each managed object. For example, the managed object nodes can be represented as child nodes below the product node. Referring to steps 225 and 230, a first managed object can be read from the managed object list. An OID of "x.z" can be assigned to the managed object, where "z" is an integer beginning with 2 that can be incremented by 1 for each successive object (e.g. 1.3.6.1.4.1.2.6.999.2; 1.3.6.1.4.1.2.6.999.3; 1.3.6.1.4.1.2.6.999.4 . . . ).

Importantly, a SNMP table can be associated with each of the managed object nodes in the MIB. Each SNMP table can be represented in the MIB definition tree as a child node to the managed object with which the SNMP table is associated. The SNMP tables enable managed objects to be instantiated any number of times, with each instantiation being represented as an entry in a corresponding SNMP table.

Each SNMP table can be assigned an OID of "x.z.a," wherein the "x.z" portion identifies the managed object with which the SNMP table is associated. Since an object typically only contains one table, the "a" portion of the table OID will typically be 1 for each table created. However, if it is desired that more than one table be created for a particular object, "a" can be incremented by one for each successive table. The logical name of the table can be the classname of the managed object with a descriptor appended to the name. For example, in a JMX implementation, a table labeled "PersonMBeanTable" represents the JMX Person MBean.

Object information then can be obtained for the managed object, as shown in step 235, and nodes can be created in the MIB definition tree for all object attributes and methods associated with the object, as shown in step 240. For example, the attributes and methods of a particular managed object can be entered into an SNMP table associated with the managed object. The attributes and methods can be repeated in each table entry which represents an instance of the managed object. Attribute "Get" and "Set" capabilities can be made to match between the SNMP protocol and the resource management extension architecture. For example, within a JMX implementation, if there is a getter and not a setter in the JMX MBean for a specific attribute, the MIB definition can indicate this with a read-only attribute.

The logical name of each of the attributes and methods defined in the MIB definition must match those attributes and methods exposed in the managed object. Thus, if the name attribute of a person is referred to as "Name" in the MIB definition, the name attribute also should be referenced as "Name" in the managed object. Further, the attribute and method names can be prefixed with a variable which is unique to the object with which the attributes and methods are associated. This particular naming convention is a requirement of SNMP to ensure uniqueness within the MIB. For instance, attributes and methods can be prefixed with the classname of the managed object. For example, the logical name for an index attribute associated with a person JMX MBean (personMBean) can be personMBeanIndex. However, variable names for objects in the MIB are not relied upon by a SNMP protocol adapter to perform mapping between SNMP OID's and managed objects. Consequently, a user can opt to edit the MIB to change logical variable names as desired, so long as a same variable name is not repeated for multiple objects.

An OID can be assigned to each entry in the table. The entry OID's can follow the convention x.z.a.b, where b is be an integer beginning with 1 and being incremented by 1 for each successive entry. The attributes and methods can be assigned an OID following the convention x.z.a.b.c, where "c" can begin with 1 and be incremented by 1 for each successive attribute or method within the entry. For example, OID's 1.3.6.1.4.1.2.6.999.2.1.1.1; 1.3.6.1.4.1.2.6.999.2.1.1.2; and 1.3.6.1.4.1.2.6.999.2.1.1.3 can represent successive attributes and/or methods in an entry 1.3.6.1.4.1.2.6.999.2.1.1 contained within table 1.3.6.1.4.1.2.6.999.2.1. The table is associated with managed object 1.3.6.1.4.1.2.6.999.2.

Referring to decision box 245 and step 250, after the attributes and methods of an object have been entered into the MIB, the mapper tool can select the next managed object in the managed object list and increment the OID "x.z" by one. Accordingly, an OID of "x.3" (e.g. 1.3.6.1.4.1.2.6.999.3) will be assigned to the next managed object, "x.4" (e.g. 1.3.6.1.4.1.2.6.999.4) to the next, and so on. Reading and storage of object data then can repeat until the information for the last requested object on the managed object list has been stored, at which point the MIB can be stored, as shown in step 255. The MIB is then ready to be accessed.

Figure 3:
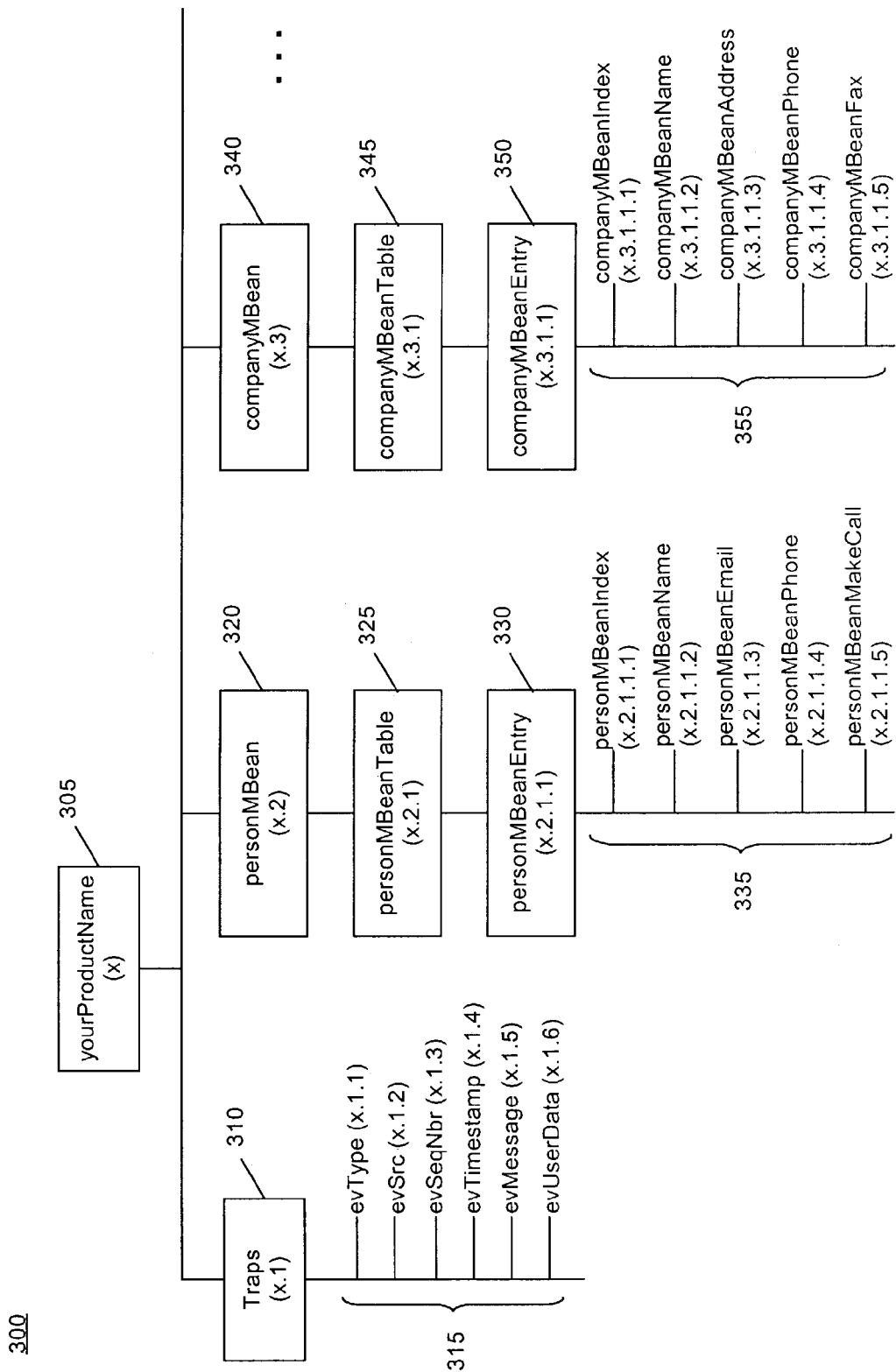
FIG. 3 is a table illustrating an exemplary management information base generated by the method of FIG. 2.

A hierarchical node structure 300 representing an exemplary MIB generated by the method of FIG. 2 is shown in FIG. 3. Traps node 310 beneath the product node 305 represents the traps group which is associated with the product. As noted, the traps group 315 can be defined within the traps node 310 wherein fields in the traps group are mapped to have a one-to-one correspondence with fields of a managed object notification.

One or more additional nodes can be provided beneath the product node 305 to represent managed objects associated with the product in the MIB. For example, a personMBean object node 320 can be provided beneath the product node 305 to represent a JMX MBean named "person" (personMBean). Additional object nodes can represent other managed objects as well. For example, a companyMBean node 340 can be provided to represent a JMX MBean named "company" (companyMBean).

Notably, object table nodes 325, 345 can be created for the managed objects and associated with the object nodes 320, 340. As is known to those skilled in the art, representing objects in an MIB using tables enables the objects to have multiple instances. Further, entry nodes, for example personMBeanEntry 330 and company MBeanEntry 350, can be associated with the table nodes. The entry nodes 330, 350 are SNMP required nodes which help to define the hierarchy of the MIB.

Leaf nodes representing object methods and attributes can be associated with the respective entry nodes. For instance, personMBean leaf nodes 335 can represent fields having attributes and methods corresponding to the person MBean object and companyMBean leaf nodes 355 can represent attributes and methods corresponding to the companyMBean object. It should be noted that although the examples contained herein are JMX MBeans, the present invention is not thus limited and can be used with any resource management extension technology.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of adding a simple network management protocol (SNMP) interface to an existing resource management extension-enabled management agent without modifying said management agent said method comprising:
   at runtime of said management agent, discovering attributes, actions, and events that are supported by a managed object of a device;
   at runtime of said management agent, reading definitions of said managed objects associated with said management agent, without re-building or recoding software management components of said manasement agent to update access to said device, wherein said managed objects publishes said definitions for said reading; and
   automatically generating an SNMP management information base (MIB) definition having a hierarchical node structure associated with SNMP tables at runtime which provides a SNMP representation of said management agent, said MIB incorporating SNMP object definitions of said attributes, actions, and events correlating to at least a portion of said read managed object definitions, wherein said automatically generating step does not require user assistance.

2. The method of claim 1, said step of automatically generating a SNMP MIB farther comprising the step of building at least one trap in said MIB, said trap corresponding to a unique management agent, wherein said trap comprises fields which have a one-to-one correspondence with fields of notifications propagated by said unique management agent.

3. The method of claim 1, said step of automatically generating a SNMP MIB further comprising the step of associating at least one of said managed objects with a SNMP table within said MIB.

4. The method of claim 3, said step of automatically generating a SNMP MIB further comprising the step of including references to multiple instantiations of said managed object in said SNMP table.

5. The method of claim 1, said step of automatically generating a SNMP MIB further comprising the step of automatically providing a name for at least one item in said MIB, said item selected from the group consisting of an attribute and a method, said item name incorporating at least a portion of a corresponding managed object name.

6. The method of claim 1, said step of automatically generating a SNMP MIB further comprising the step of prefixing a none of each attribute and method in said MIB wit a name of a corresponding managed object.

7. The method of claim 1, said step of automatically generating a SNMP MIB further comprising the steps:
   filtering said managed object definitions to select a portion of said managed object definitions which correspond to specified parameters; and
   incorporating into said MIB only SNMP object definitions which correlate to said selected managed object definitions.

8. The method of claim 1, said step of automatically generating a SNMP MIB further comprising the step of providing a SNMP protocol adapter, said SNMP protocol adapter serving as an interface between said management agent and a SNMP management system.

9. The method of claim 1, wherein said management agent is implemented in Java.

10. The method of claim 9, wherein said resource management extension is Java Management Extension (JMX).

11. The method of claim 10, wherein said management agent is a JMX management bean server (MBeanServer) and said managed objects are JMX managed beans (MBeans).

12. A machine-readable storage, having stored thereon a computer program having a plurality of code sections executable by a machine for causing the machine to perform the steps of:
   at runtime of said management agent, discovering attributes, actions, and events that are supported by a managed object of a device;
   at runtime of said management agent, reading definitions of said managed objects associated with said management agent, without re-building or recoding software management components of said management agent, for updating access to said device, wherein said managed objects publishes said definitions for said reading; and
   automatically generating an SNMP management information base (MIB) definition having hierarchical node structure associated with tables at runtime which provides a SNMP representation of said management agent, said MIB incorporating SNMP object definitions of said attributes, actions, and events correlating to at least a portion of said read managed object definitions, wherein said automatically generating step does not require user assistance.

13. The machine readable storage of claim 12, said step of automatically generating a SNMP MIB further comprising the step of building at least one trap in said MIB, said trap corresponding to a unique management agent, wherein said trap comprises fields which have a one-to-one correspondence wit fields of notifications propagated by said unique management agent.

14. The machine readable storage of claim 12, said step of automatically generating a SNMP MIB further comprising the step of associating at least one of said managed objects with a SNMP table within said MIB.

15. The machine readable storage of claim 14, said step of automatically generating a SNMP MIB further comprising the step of including references to multiple instantiations of said managed object in said SNMP table.

16. The machine readable storage of claim 12, said step of automatically generating a SNMP MIB further comprising the step of automatically providing a name for at least one item in said MIB, said item selected from the group consisting of an attribute and a method, said item name incorporating at least a portion of a corresponding managed object name.

17. The machine readable storage of claim 12, said step of automatically generating a SNMP MIB further comprising the step of prefixing a name of each attribute and method in said MIB with a name of a corresponding managed object.

18. The machine readable storage of claim 12, said step of automatically generating a SNMP MIB further comprising the steps:
    filtering said managed object definitions to select a portion of said managed object definitions which correspond to specified parameters; and
    incorporating into said MIB only SNMP object definitions which correlate to said selected managed object definitions.

19. The machine readable storage of claim 12, said step of automatically generating a SNMP MIB further comprising the step of providing a SNMP protocol adapter, said SNMP protocol adapter serving as an interface between said management agent and a SNMP management system.

20. The machine readable storage of claim 12, wherein said management agent is implemented in Java.

21. The machine readable storage of claim 20, wherein said resource management extension is Java Management Extension (JMX).

22. The machine readable storage of claim 21, wherein said management agent is a JMX management bean server (MBeanServer) and said managed objects are JMX managed beans (MBeans).

* * * * *